United States Patent
Kusumi et al.

(10) Patent No.: US 6,252,630 B1
(45) Date of Patent: Jun. 26, 2001

(54) RECEIVER AND RECEIVING METHOD

(75) Inventors: Hiroshi Kusumi, Kanagawa; Tatsuya Wakahara, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/242,035

(22) PCT Filed: Jun. 9, 1998

(86) PCT No.: PCT/JP98/02533

§ 371 Date: Feb. 5, 1999

§ 102(e) Date: Feb. 5, 1999

(87) PCT Pub. No.: WO98/57493

PCT Pub. Date: Dec. 17, 1998

(30) Foreign Application Priority Data

Jun. 9, 1997 (JP) .................................................. 9-150867

(51) Int. Cl.[7] .............................. H04N 7/00; H04N 11/00
(52) U.S. Cl. .......................... 348/460; 348/552; 386/83; 725/88; 725/21; 725/142
(58) Field of Search ............................... 348/5, 460, 473, 348/474, 552, 564, 569, 570, 553, 725, 906; 360/60; 386/1, 83; 725/48, 87, 88, 21, 39, 133, 135, 141, 142, 143

(56) References Cited

U.S. PATENT DOCUMENTS

| | | | |
|---|---|---|---|
| 4,706,121 | * 11/1987 | Young | 386/83 |
| 5,541,738 | * 7/1996 | Mankovitz | 358/335 |
| 5,608,534 | * 3/1997 | Park et al. | 386/83 |
| 5,614,940 | * 3/1997 | Cobbley et al. | 348/7 |
| 5,621,579 | * 4/1997 | Yuen | 386/121 |
| 5,654,747 | * 8/1997 | Offesen et al. | 348/12 |
| 5,726,702 | * 3/1998 | Hamaguchi et al. | 348/563 |
| 5,790,172 | * 8/1998 | Imanaka | 348/7 |
| 5,805,763 | * 9/1998 | Lawler et al. | 386/83 |
| 5,818,510 | * 10/1998 | Cobbley et al. | 348/7 |
| 5,856,852 | * 1/1999 | Huh | 348/460 |
| 5,900,912 | * 5/1999 | Nishigaki et al. | 348/460 |
| 5,963,264 | * 10/1999 | Jackson | 348/460 |
| 6,058,238 | * 5/2000 | Ng | 386/46 |
| 6,064,441 | * 5/2000 | Okamoto | 348/485 |

FOREIGN PATENT DOCUMENTS

WO 96/27840 * 9/1996 (WO).

* cited by examiner

Primary Examiner—Reinhard J. Eisenzopf
Assistant Examiner—Brian P. Yenke
(74) Attorney, Agent, or Firm—Frommer Lawrence & Haug, LLP.; William S. Frommer; Gordon Kessler (57) ABSTRACT

The signal receiving device, during the fixed time period the fixed time before the telecast start time point of the recording reserved program, as well as causing the external recording device to output the video information of the program information image formed based on the program information data, causes said external recording device to conduct the recording operation. Then, in a state in which video information of the recording reserved program is sent out to the external recording device, it causes the external recording device to execute the recording operation during the period from the time point a few seconds before the telecast start time point to the telecast stop time point of the recording reserved program. Thus, the video information of the program information image and the video information of the recording reserved program can be recorded automatically onto the external recording device based on the registered information of the recording reserved program conducted to the signal receiving device.

14 Claims, 7 Drawing Sheets

RECEIVER AND RECEIVING METHOD

FIELD OF THE INVENTION

The present invention relates to a signal receiving device and a signal receiving method and is suitably applied to a signal receiving device and a signal receiving method for obtaining audio/video signals by receiving telecast waves and outputting said audio/video signals to an external recording device.

DESCRIPTION OF THE PRIOR ART

In recent years the telecasting system for transmitting television signals upon digitizing via the satellite such as broadcast satellite and communication satellite, and receiving and viewing the telecasting signal from the satellite by means of the digital satellite telecast receiving device provided in each home has been widely spreading.

In this telecasting system, approximately 150 channels are available, and as compared with the conventional terrestrial waves, a great many programs can be broadcasted. And in order that the user can select the desired program correctly from among the enormous numbers of programs, the data of electronic program guide is transmitted as the telecast scheduled program information.

In the digital satellite telecast receiving device, an electronic program guide table is formed based on the electronic program guide data so that it can be displayed and the user can select the desired program by referring to this electronic program guide table.

The contents of this electronic program guide consist of the title of each program (program name), telecast time (date, and time period, etc.), the name of telecasting station, information on the viewing condition such as fee must be paid or not, the brief description of contents and additional information on such as the cast.

Furthermore, in the case of recording the program received by said digital satellite telecast receiving device under the condition where no digital satellite telecast receiving device is built in the recording device such as VTR (video tape recorder), generally, the audio video source received by the digital satellite telecast receiving device is put into the VTR and said VTR side records this audio video source.

Since the digital satellite telecast receiving device and the VTR are separate independent devices, in the case of recording the image received by the digital satellite telecast receiving device and the user wants to record the desired program, it is necessary that the digital satellite telecast receiving device side selects the desired program, while the VTR side conducts the required setting and operation so that the recording of the program selected by the digital satellite telecast receiving device side can be conducted according to the starting time of the program selected by the digital satellite telecast receiving device side. In short, when the user records the desired program, he is required to go through the complicated operation for multiple equipments.

Furthermore, in this case, as the digital satellite telecast receiving device side information to be recorded on the VTR side only audio and video signals of the program which are actually put on the air can be obtained. For example, since the electronic program guide information to be obtained at the digital satellite telecast receiving device side contains the contents as described above, it is sufficiently effective as the information of recorded program that can be referred after it is recorded. However, since the electronic program guide information is not recorded on the video tape recorded by the VTR, this is not effectively reflected as it is.

DISCLOSURE OF THE INVENTION

The present invention has been done considering the above points and is proposing a signal receiving device and a signal receiving method capable of offering the environment having satisfactory usability to the user and effectively reflecting the electronic program guide data information piled over the telecast wave even after the program is recorded on the VTR.

To obviate such problems according to the present invention, we provide a channel selecting means for selecting channels; a telecast video output means for outputting video information of the channel selected by the channel selecting means; a program information image output means for forming program information image having the information related to the programs based on the program information data per program and outputting the video information of said program information image; a recording reserved program setting means for registering the desired program from among the telecast scheduled programs as the recording reserved program, and an output control means for executing the control to the program information image output means which causes the video information of the program information image corresponding to the recording reserved program to be sent out at the predetermined timing different from the broadcast time of the recording reserved program based on the contents of the recording reserved program set by the recording reserved program setting means and the control to the telecast video output means which causes the video information of the recording reserved program to be output at least during the time period of telecasting of the recording reserved program; and an operation control means for controlling the recording operation of the external recording device in which video information of the recording reserved program to be transmitted from the telecast video output means and the video information of the program information image to be transmitted from the program information image output means are entered corresponding respectively to the time period during which video information of the program information image is transmitted and the time period during which video information of the recording reserved program is transmitted.

By connecting external recording device in order that the video (audio) information to be sent out is supplied to the external recording device, the recording reserved program registered at the receiving device side can be reserved recording with respect to the external recording device, and when conducting this scheduled recording, the program information image concerning the recording reserved program formed based on the program information data can be recorded on the recording medium of the external recording device in addition to the recording reserved program.

According to the present invention as described above, the recording reserved program registered at the receiving device side can be reserved recording with respect to the external recording device, and simultaneously, when conducting this reserved recording, the title image on the recording reserved program formed based on the program information data can be recorded in addition to the recording reserved program, and thus, even though the receiving device and the external recording device are separate independent equipments, scheduled recording can be executed only by conducting the operation for an ordinary reservation recording setting and at the same time, this can be recorded with the title picture regarding said recording reserved program attached in every recording reserved program, and these can be used as useful recording history information when reproducing these, and thus, even though the receiving device and the external recording device are regarded as separate equipments, the AV system having the ease of use feature for the user can be formed and the receiving device capable of effectively utilizing the program information data obtained at the signal receiving device side can be realized.

Furthermore, according to the present invention, based on the contents of the desired program registered from among the telecast scheduled program of the selected channel as the recording reserved program, the control for outputting the video information of the program information image corresponding to the recording reserved program formed based on the program information data at the predetermined timing different from the broadcast time of the recording reserved program and the control for outputting the video information of the recording reserved program at least during the telecasting time of the recording reserved program will be conducted, and the recording operation of the external recording device in which the video information of the recording reserved program and the video information of the program information image to be put out corresponding respectively to the time period during which the video information of the program information image is being output and the time period during which video information of the recording reserved program is output will be controlled.

Since the video (and audio) information to be output is supplied to the external recording device, as well as the recording reserved program can be reserved for recording onto the external recording device, in the case of conducting this reserved recording, the program information image regarding the recording reserved program formed based on the program information data can be recorded on the recording medium of the external recording device in addition to the recording reserved program.

According to the present invention as described above, the recording reserved program registered can be reserved the recording onto the external recording device, and in the case of conducting this schedule recording, the title image regarding the recording reserved program formed based on the program information data can be recorded in addition to the recording reserved program, and thus, even though the receiving device and the external recording device are separate equipments, the scheduled recording can be executed only by conducting the operation for normal reserved recording setting, and simultaneously, the title image regarding said recording reserved program can be recorded in every recording reserved program and can be utilized as very useful recording history information at the time when reproducing these, and thus, although the signal receiving device and the external recording device are separate equipments each other, the signal receiving method capable of effectively utilizing the program information data obtained at the signal receiving device side can be realized.

DESCRIPTION OF THE PREFERRED EMBODIMENTS

An embodiment of the present invention will be described in detail with reference to the accompanying drawings.

(1) Construction of Recording System

Figure 1:
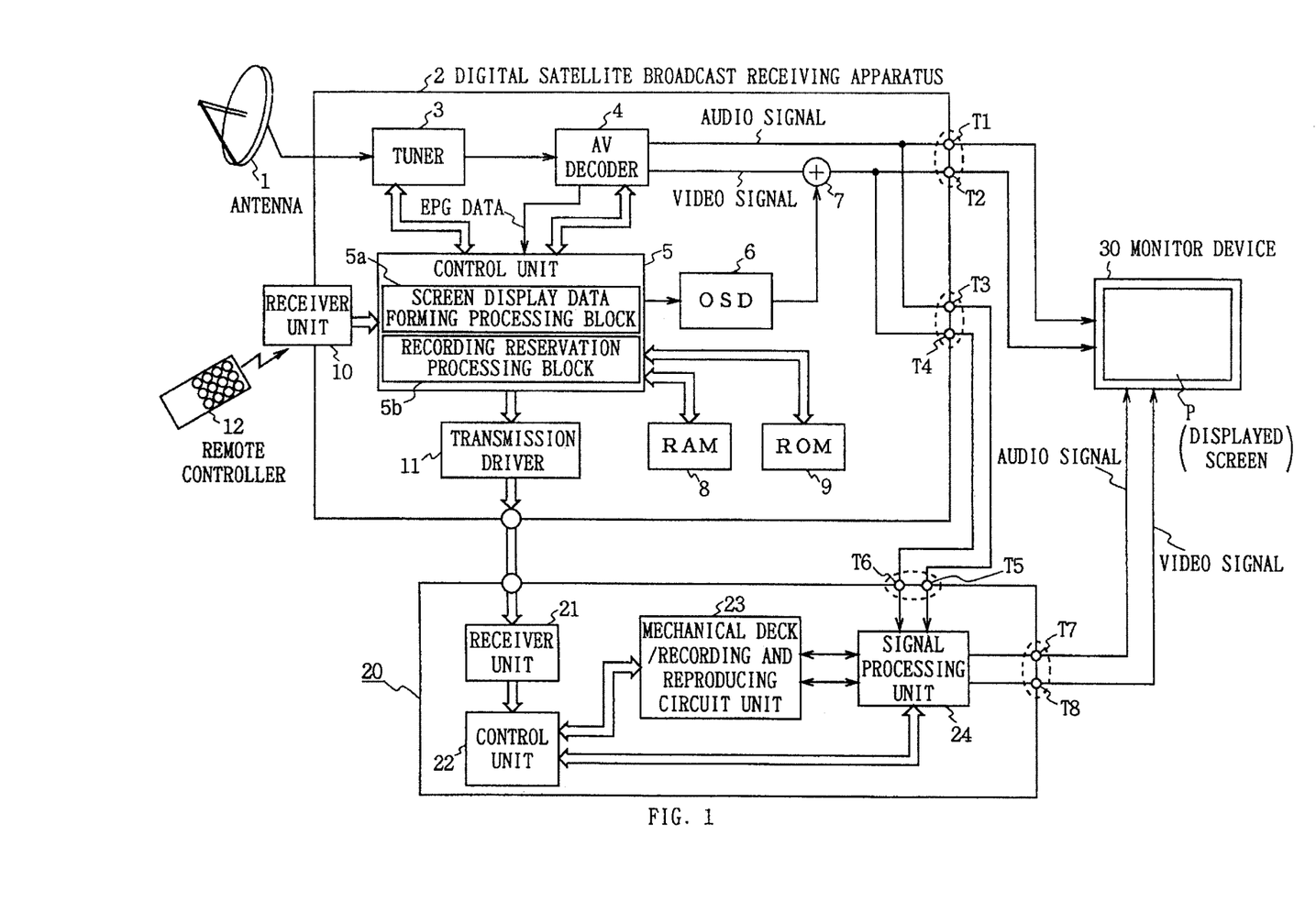
FIG. 1 is a block diagram showing an example of the audio visual system comprised of a digital satellite telecast receiving device according to the embodiment of the present invention.

FIG. 1 is a block diagram showing an example of the construction of an AV system comprised of a digital satellite telecast receiving device which is the receiving device according to the embodiment of the present invention.

The recording system shown in this FIG. comprises an antenna 1, a digital satellite telecast receiving device 2, a VTR 20, and a monitor 30.

The telecast wave received by the antenna 1 is supplied to a tuner 3 in the digital satellite telecast receiving device 2. In this telecast wave, the program guide information data (hereinafter referred to as EPG (electronic program guide)) is overlapped.

Since in the digital satellite telecasting system, the telecast wave is transmitted by the cable television (CATV), and besides, it is transmitted from the satellite telecasting, the cable terminal of CATV may be connected with the tuner 3 instead of receiving it via said antenna 1.

The tuner 3 is so constructed that the channel selection processing will be conducted by the control of the control unit 5 for controlling the overall construction. Output of the tuner 3 is supplied to an AV decoder 4. Also the output of this tuner 3 containing the EPG data in addition to the audio and video information.

The AV decoder 4 has the function to extract EPG data contained in the output of the tuner 3 and supply to the control unit 5 corresponding to the control of the control unit 5. This EPG data is converted to an image data for the required display screen (data for CRT screen display) by the control of the CRT screen display data forming processing block 5a in the control unit 5 and supplied to an on-screen display circuit (OSD circuit) 6. In this connection, according to the present embodiment at least two kinds, such as an electronic program guide having a role as a program table for offering the reserved programs and a title image playing a role of title scene of the recording program, will be formed.

Furthermore, the desired decoding processing and the signal processing will be conducted onto the video data and audio data out of outputs of the tuner 3 entered into the AV decoder 4, and sent out as video signal and audio signal. In this case, as the video signal and audio signal to be put out from the AV decoder 4 it is considered that either format, digital signal or analog signal, may be acceptable.

In this case, of the video signal and audio signal to be supplied from the control unit 5, the video signal is supplied to a video combining circuit 7, and the audio signal is supplied after being branched off into audio output terminals T1 and T3.

The OSD circuit 6 forms a video signal of the program information (CRT screen display signal) based on the image data of the CRT screen display data (program information data) supplied from the control unit 5 and supplies this to the video combining circuit 7.

The video combining circuit 7 combines the video signal supplied from the AV decoder 4 and the video signal (CRT screen display signal) supplied from the OSD circuit 6 and branches off that combined video signal into the video output terminals T2, T4 so that it can be output.

The remote controller 12 is provided as an operation key for executing the desired operation to the digital satellite telecasting receiving device 2. A command signal transmitted from the remote controller 12 responding to the user's operation will be received at the receiving unit 10 of the digital satellite broadcast receiving device 2 side and transmitted to the control unit 5.

In this connection, an operation unit (not shown in FIG. here) equipped with operation keys similar to that of the remote controller 12 may be provided in the main body of the digital satellite telecast receiving device 2.

The control unit 5, as well as executing the desired control processing to each functional circuit in the digital satellite telecast receiving device 2 responding to the command signal received, forms data for CRT screen display based on the EPG data as described above and executes the control for outputting this as the video signal.

Furthermore, the digital satellite telecast receiving device according to this embodiment is equipped with the reserved recording function capable of reserved recording the program received to the external recording devices in advance, and the control unit 5 is comprised of a recording reserve processing block 5b. In this connection, the control processing as the recording reserve processing block 5b will be described later.

Data which the control unit 5 utilizes when executing various control processings are temporarily stored in the RAM 8 and in addition to this, an area in which EPG data extracted by the AV decoder 4 is provided in this RAM 8. Moreover, according to the present embodiment, an area in which information of the recording reserved program specified as will be described later is provided.

In the ROM 9, various program data which the control unit 5 should execute are stored, besides, in order to correspond to the reserved recording function, it has a table corresponding to the command codes adopted to VTRs of various makers and according to models.

According to the present embodiment, for example, the maker and the model of the VTR will be set in advance according to the prescribed operation of the user and the control unit 5 causes the RAM 8 to hold this setting content, for example. And when it is necessary to control the external VTR operation, referring to said table, the required command code conforming to the maker and the model set by the user will be supplied to the transmission driver 11. The transmission driver 11 modulates the input command code according to the prescribed transmission system and sends this out as a command signal. In this FIG. a pattern to conduct the transmission to the VTR 20 via the cable is shown. However, the transmission system of command signal is not only limited to this but also the wireless transmission system such as using the infrared ray and radio wave can be considered as a matter of course. Moreover, changes may be made as to which transmission system would be selected may be alterable according to the VTR to be controlled as occasion demands.

The VTR 20 is constructed as a separate device from said digital satellite telecast receiving device 2, and this enters audio/video signals supplied from outside and can record these on the magnetic tape.

In the VTR 20 shown in this FIG. , main units of recording/reproduction system are generally shown, and a signal receiving unit 21, a control unit 22, a mechanical deck/reproduction circuit 23 and a signal processing unit 24 are provided.

The signal receiving unit 21 receives a command signal transmitted from the outside and conducts the required demodulation processing and transmits this to the control unit 22. The control unit executes the required control processing to the mechanical deck/reproduction circuit 23 and the signal processing unit 24 based on the command signal received.

The mechanical deck/recording reproduction circuit 23 is comprised of a loading mechanism for loading the loaded video tape cassette magnetic tape, a running mechanism for running the loaded magnetic tape at the fixed speed, a rotating mechanism for rotating the rotary drum equipped with a head for conducting the recording/reproduction by helically scanning the magnetic tape at the proper speed and phase, and a servo circuit system for realizing the proper driving operation of said run driving mechanism and rotating mechanism, and a recording/reproduction amplifier for recording/reproducing signals by means of said rotary head.

At the time of recording, the signal processing unit 24 enters video signal and audio signal entered from the outside, or video signal and audio signal to be obtained upon receiving and selecting the terrestrial wave telecasting, analog satellite telecasting or digital satellite telecasting by the inside tuner and provides the required signal processing, and finally after encoding this to the recording signal conforming to the prescribed recording format, supplies this to the mechanical deck/recording reproduction circuit 23.

Furthermore, at the time of reproduction, the signal processing unit 24 outputs video signal and audio signal which are obtained by applying the decoding processing corresponding to said recording format to the reproduction signal to be supplied from the mechanical deck/recording reproduction circuit 23.

In this case, since the audio input terminal T5 and the video input terminal T6 of the VTR 20 are connected with the audio output terminal T3 and the video output terminal T4 of the digital satellite telecast receiving device 2 respectively, the audio video output of the digital satellite telecast receiving device 2 can be entered into said signal processing unit 24.

Furthermore, the video signal and the audio signal reproduced at the VTR 20 will be transmitted to the monitor device 30 via the video output terminal T8 and the audio output terminal T7.

In this case, each video and audio signal outputs of the digital satellite telecast receiving device 2 and the VTR 20 are supplied respectively to the monitor device 30 as the input source, and for example, either the video source to be put out from the digital satellite telecast receiving device 2 or the VTR 20 can be viewed by the user optionally selecting the input source for example.

(2) Reserving Recording Operation

The basic recording reservation operation to be conducted by the digital satellite telecast receiving device 2 constructed as described above and the audio visual system that contains this device will be described in the following chapter.

In conducting the recording reservation according to the present embodiment, firstly, the user registers the recording scheduled program by operating the required operation key in utilizing the remote controller 12 corresponding to the digital satellite telecast receiving device 2. Although detailed explanations of the operating procedure at this point will be omitted, suppose that the user interface is so constructed that the operation for specifying the recording scheduled program selected optionally by the user according to the electronic program guide displayed on the monitor device 30 can be conducted. Then, the control unit 5 of the digital satellite telecast receiving device 2, making the telecasting channel and telecasting time period of the specified program can be identified, controls the specified program in order that it can be stored in the prescribed area of the RAM 8 as a recording reserved data.

The registration setting processing of said recording scheduled program and the control concerning the reserved recording execution processing that will be described hereinafter can be realized mainly by executing the processing as the recording reservation processing block 5b of the control unit 5.

The overall system operation in the case of recording one recording reserved program under the condition in which the recording scheduled program is registered as described above will be explained with reference to FIG. 2 as follows.

Figure 2:
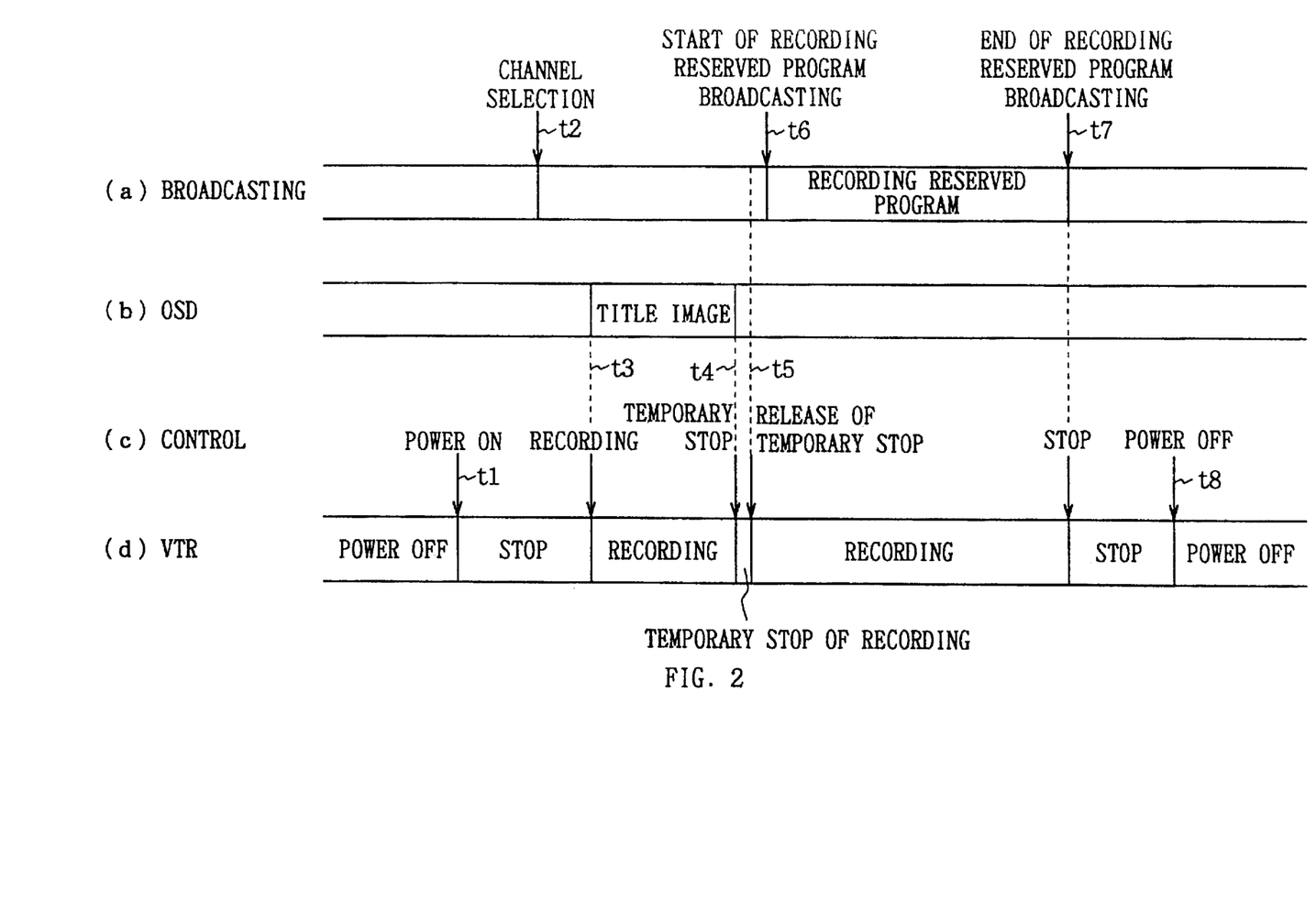
FIG. 2 is a diagram showing the operation at the time of reserved recording of the digital satellite telecast receiving device according to the embodiment of the present invention.

FIG. 2a shows one recording reserved program according to telecasting time periods. Moreover, FIG. 2b shows the timing of video signal to be sent out from the OSD circuit 6. FIG. 2c shows the control to the VTR 20 by the digital satellite telecast receiving device 2, and the transition of operating condition of the VTR 20 by the control of the digital satellite telecast receiving device 2 is shown in FIG. 2d.

At this point, if it reaches at the time point t1, the fixed time before the time point t6, that is the broadcast start time of the recording reserved program (FIG. 2d), the control unit 5 of the digital satellite telecast receiving device 2 transmits a command signal for turning on the electric source to the VTR 20. Thus, if the electric power of the VTR 20 is set off condition before the time point tl, the power is set on condition. At this stage, the magnetic tape drive is in the quiescent condition.

In the case where the tape cassette has been loaded before the time point tl and the VTR 20 is so constructed that it can select the input source, it is necessary that audio video input terminals (T6, T5) to which the audio video source of the digital satellite telecasting receiving device 2 is connected should be selected in advance. As to the selection of video sources (not shown in FIG. ), it is considered that the command signal for selecting the video source will be transmitted from the digital satellite telecast receiving device 2 at the fixed timing before the recording starts after the time point t1.

Furthermore, the control timing of the control unit 5 after the time point t1 will be set based on the telecast start time and the stop time of the recording reserved program. However, the telecast start time and the stop time of the recording reserved program can be identified based on the registered data of the recording reserved program stored in the RAM 8 or EPG data.

Then, when reaching to the time point t2 after the fixed time period elapsed from the time point tl, the control unit 5 controls the tuner 3 and conducts the tuning for telecasting channel of the recording reserved program and makes it wait (FIG. 2a). With this arrangement, after the time point t2, video of the broadcasting station, which is selected via the video output terminal T2, T4 from the AV decoder 4 and the video combining circuit 7 will be transmitted, and for example, this video can be viewed in the monitor device 30.

Figure 3:
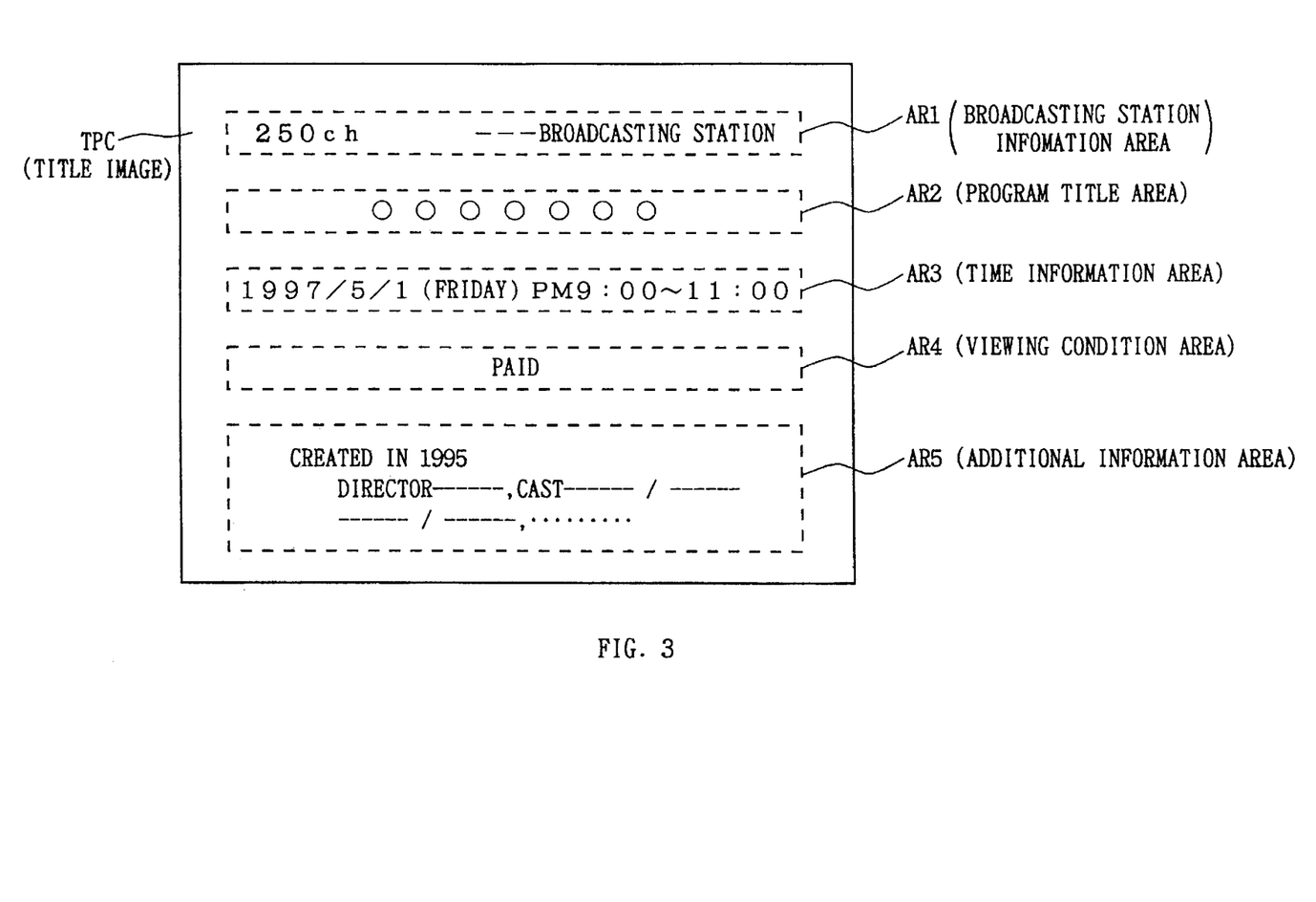
FIG. 3 is a diagram showing an example of display of the title image.

Reaching to the time point t3 elapsed the fixed time period further from said time point t2, the control unit 5 forms title image TPC data shown in FIG. 3 based on the recording reservation registered data according to the contents corresponding to the recording program to be put on the air after the time point t5 and outputs this to the OSD circuit 6 (FIG. 2b).

The OSD circuit 6 outputs the title image TPC data entered to the video combining circuit 7 as video signal. Thus, the video signal of the title image TPC is combined with the broadcast video signal transmitted from the AV decoder 4 and will be supplied to the monitor device 30 and the VTR 20.

In this connection, although various kinds of image conditions can be considered as the image condition to be formed by the combining processing in the video combining circuit 7, it is desirable to have the display system of which the title image TPC becomes main display by conducting the combining processing at the video combining circuit 7 in order that only the title image TPC is displayed but making the broadcast signal not displayed, for example. Or it can be considered that the broadcast signal would be piled over the background of the title image TPC.

In this case, said title image TPC is regarded as the image data of the still picture formed by the processing of the CRT screen display data forming processing block 5a of the control unit 5 as described above.

As the display contents of this title image TPC, as shown in FIG. 3 for example, a television station information area AR1, a program title area AR2, a time information area AR3, a viewing condition area AR4 and an additional information area AR5 are provided.

In the television station information area AR1, the channel number and the name of TV station to broadcast the recording reserved program, such as "250 ch—Station" are displayed, and in the program title area AR2 the actual program title name is displayed on the part shown by "0000000", and in the time information area AR3, the date of telecasting of the recording reserved program, and the time of telecasting, such as "1997/5/1 (Fri) PM9:00–11:00" will be displayed.

Moreover, in the digital satellite telecasting there are programs which can be viewed free of charge and there are pay programs which can be viewed by paying the fee and descramble is conducted, and furthermore, there are pay programs which are required additional fees at the time of recording. In the viewing condition area AR4, distinction between pay/free, in the case of pay program, viewing fee, and the other information will be displayed as the viewing condition regarding the recording reserved program.

In the additional information area AR5, as various additional information regarding the recording reserved program, if the recording reserved program is a movie for example, various kinds of comments information on this movie such as "Produced in 1995, Director: - - - , Starring: - - - / - - - / - - - /. . . " can be displayed.

As described above, the title image TPC video will be put out after the time point t3 of FIG. 2. However, the control unit 5 executes the control to transmit the command signal for starting the recording to the VTR 20 at the timing of the same time point t3 (FIG. 2d). Thus, the VTR 20 starts the recording operation, and the video signal entered into the VTR 20 is the title image TPC having the contents formed corresponding to the recording reserved program and accordingly, this title image TPC will be recorded by the VTR 20 after the time point t3.

And reaching at the time point t4, the fixed time elapsed from the time point t3, the control unit 5 transmits a command signal to stop temporarily to the VTR 20 and sets the recording operation of the VTR 20 in stop condition (FIG. 2d). And also the control unit 5 executes the control for stopping the video output of the title image TPC from the OSD circuit 6 (FIG. 2b).

At the step after this point t4 has passed, the magnetic tape of the VTR 20 is temporarily suspended in a state in which the title image TPC is recorded during the time period corresponding to the period t3–t4, and also the broadcast video signal of the channel of the recording reserved program is supplied to the VTR 20 and the monitor device 30.

Then, comparatively short period of time from said time point t4 has passed and when reaching to the time point t5, the fixed time (approximately a few seconds) before the on-air start time of the recording reserved program, the control unit 5 transmits the command signal to cancel the temporary suspension to the VTR 20 (FIG. 2d). If the temporary stop/cancellation command is toggle code, the same command signal transmitted at the time point t4 may be transmitted at this time point t5.

After the time point t5, the recording operation by the VTR 20 will be continued, however, since the telecasting of the recording reserved program will be started after the time point t6, a few seconds after the time point t5 (FIG. 2a), this recording reserved program will be recorded from its head.

Then, when it reaches to the time point t7 (FIG. 2a), the broadcast stop time of the recording reserved program, the control unit 5 transmits the command signal to stop the recording operation to the VTR 20 (FIG. 2d), and then, the time point t8, after the fixed time passed, the control unit transmits the command signal to turn off the electric power of the VTR 20 (FIG. 2d).

After the time point t8, if the other registered recording reserved program still remains, this period becomes the waiting period for recording the next reserved recording program.

In this connection, although it is possible to arrange the recording reserved program to be recorded continuously from the title image TPC without providing the temporary suspension period from t4 to t5 in FIG. 2, the reason for not conducting this is to avoid the recording of images having possible disturbance when stopping to combine the title image TPC at the telecast start time, the time point t5, and aiming that the joint of the title image TPC and the recording reserved program will be connected beautifully.

Furthermore, as the transmission timing (time point t5) of the temporary suspension cancellation command signal for starting the recording of the recording reserved program, the reason for executing this a few seconds earlier than the on-air start time point t6 is to make sure that the stable recording can be conducted from the beginning of recording program, if the VTR 20 is the device which starts the actual recording of magnetic tape with the blank period of few seconds after receiving the temporary suspension cancellation command and recording start command, or if the image condition to be recorded would not be stable in some time from the recording start time. Accordingly, under the service condition in which the above points can be disregarded, the control processing from the time period t4 to t5 of FIG. 2 can be omitted.

Figure 4:
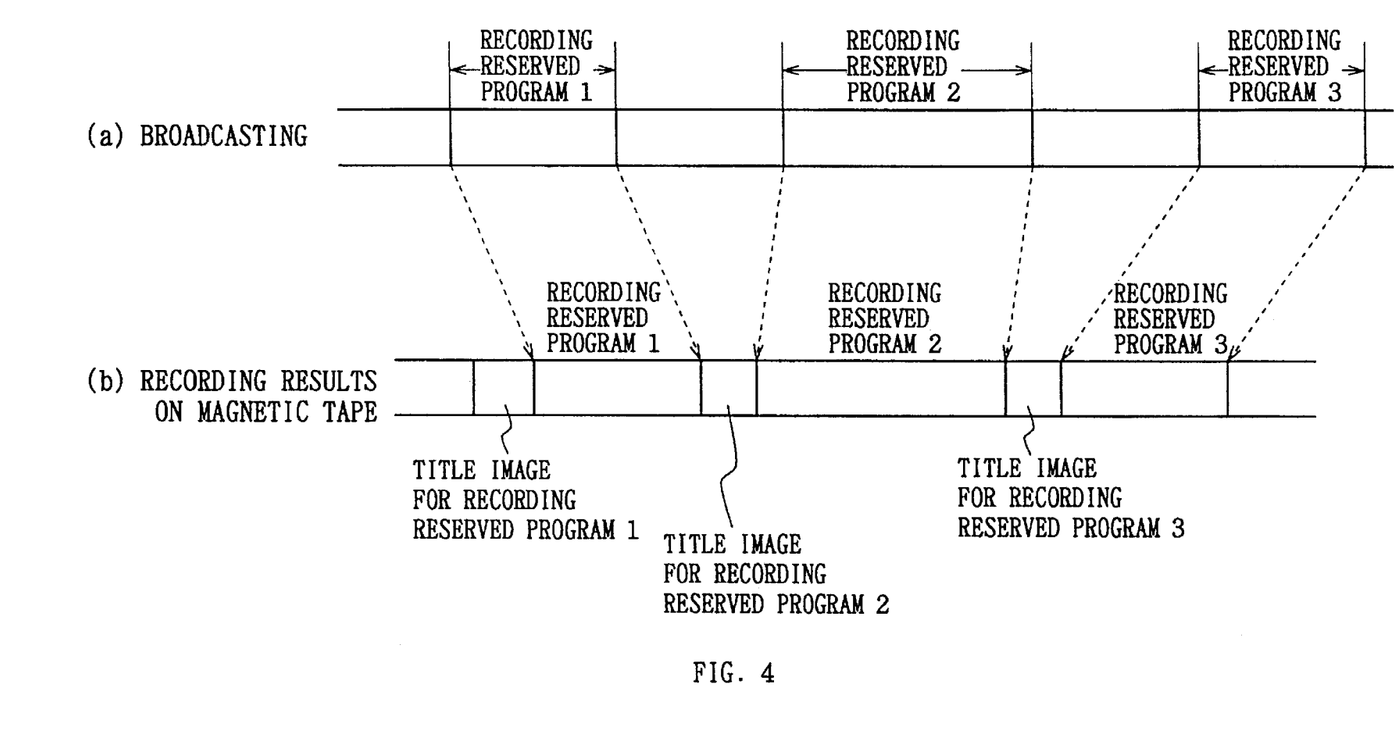
FIG. 4 is a diagram showing the recording condition of a tape cassette to be obtained by the reserved recording operation of the digital satellite telecast receiving device.

For example, under the condition in which the same tape cassette is loaded in the VTR 20 side, if the recording operation shown in FIG. 2 is conducted per multiple recording reserved programs, the recording result of said tape cassette becomes such as shown in FIG. 4.

In FIG. 4a, the user registered 3 recording reserved programs are shown according to the telecast time and the condition of recording result of the magnetic tape in the tape cassette is shown in FIG. 4b.

If the reserved recording operation according to the present embodiment would be executed successively to the recording reserved programs 1, 2 and 3, the title image TPC of the recording reserved program 1 is recorded for the fixed time as shown in FIG. 4b, and then, the state in which the recording reserved program 1 is recorded can be obtained.

Then, following the recording stop position of the recording reserved program 1, the title image TPC of the recording reserved program 2 and the recording reserved program 2 will be recorded in the same manner as above, and moreover, following this stop position, the title image TPC of the recording reserved program 3 and the recording reserved program 3 will be recorded.

Moreover, in the case of reproducing and viewing the magnetic tape on which recording has been conducted as described above, the title image TPC of the recording reserved program appears for the fixed time period according to the pattern shown in FIG. 3 before the recording reserved program to be viewed is reproduced, and then the recorded recording reserved program will run.

Accordingly, since the title image TPC is reproduced before the reproduction of the recording reserved program, the user can obtain the information on the program that he wants to see in advance. Moreover, in the case of searching the recorded program by fast forwarding or rewinding the magnetic tape, it becomes very useful if the recorded title image TPC would be referred.

Moreover, this title image TPC will be automatically formed based on the EPG data which is transmitted piled over telecast waves. In short, it is unnecessary for the user to conduct the special operation for forming the title image TPC and the user can effectively utilize the EPG data which is originally for displaying the electronic program guide at the digital satellite telecast receiving device 2 side.

Accordingly, it is considered that the titling function which makes the title image TPC can be recorded in order that on/off can be switched optionally by the user operating the remote controller 12. In this case, if the user judges it unnecessary, at the time of reserved recording, he can set that the title image TPC would not be recorded.

(3) Processing Operation When Implementing Reserved Program

Next, the processing operation for implementing the reserved recording operation according to the embodiment shown in FIG. 2 will be described with reference to FIGS. 5 and 6. The processing operations shown in these FIGS. will be conducted as the processings of the recording reserved processing block 5b and the CRT screen display data forming processing block 5a of the control unit 5. Moreover, at this point, the definite time has been set as the processing timing of the step before the recording starts in FIG. 2.

In the routine shown in this Fig., firstly, at the step S101, whether the recording scheduled program has been registered to the RAM 8 or not will be determined by the control unit 5, and in the case where no registration has been conducted, the control unit terminates the routine processing shown in this FIG. 1mmediately.

On the other hand, if it is judged that the recording reserved program has been registered to the RAM 8, the control unit 5 proceeds to the step S102 and judges whether the reserved recording operation for previous reserved recording program is presently being conducted or not, i.e., the operation of the time period t1–t7 shown in FIG. 2 is presently being conducted or not.

At the step S102, if it is judged that the previous reserved recording operation is being conducted, the control unit 5 proceeds to the step S103 and waits till one minute before the telecast start time of the current reserved recording operation, and proceeding to the step S104, one minute before the telecast start time, transmits the command signal for recording operation stop to the VTR 20 and proceeds to the step S108. Thus, when the telecast time periods of the previous recording reserved program and the current recording reserved program are continuous, the control unit 5 proceeds to the step S108 through the processings of steps S102–S103–S104, and this is the case where there is no need for executing the command transmission processing of putting the power on to the VTR 20, which corresponds to the time point t1 of FIG. 2.

On the other hand, in the case where it is judged that the previous reserved recording operation is not being executed at the step S102, the control unit 5 proceeds to the step S105 and waits until 2 minutes before the on-air time of the recording reserved program, and transmits the command to turn on the electric power to the VTR 20 at the step S106. The processing of this 2 minutes before reserved time starts at the step S106, that corresponds to the time point t1 in FIG. 2.

At the step S107, the control unit 5 waits until one minute before the telecast start time of the recording reserved program and moves to the step S108. The processing of step S108 is the processing corresponding to the time point t2 of FIG. 2 and the control unit 5 executes the control for selecting the channel of the recording reserved program to the tuner 3.

Then, at the following step S109, the control unit 5 judges whether the titling function for recording the title image TPC is put on or not, and when it is off, moves to the step S110. But when it is on, the control unit 5 proceeds to the step S112 and after waiting until 30 seconds before the on air time of the reserved recording program, proceeds to the step S113.

At the step S113, the control unit 5, forming the title image TPC having the contents corresponding to the current recording reserved program based on the EPG data as described above, executes the control for displaying it outside, and proceeding to the step S114, it transmits the command signal for recording start to the VTR 20. The processings of steps S113 and S114 correspond to the operation of the time point t3 of FIG. 2.

Then, the control unit 5, after waiting for 20 seconds at the step S115, proceeds to the step S116 and transmits the command signal for temporary stop to the VTR 20 as the operation which corresponds to the time point t4 of FIG. 2. And at the following step S117, it stops the display of the title image TPC which has been displayed since the step S113.

At the following step S119, the control unit 5 transmits the command signal for temporary stop cancellation to the VTR 20. This corresponds to the operation of the time point t5 of FIG. 2.

In this connection, since the processings of steps S110 and S111 are similar to that of the steps S118 and S119, explanations will be omitted. However, in the case where it is moved from the step S109 to the step S110 and step S111, the control processing for recording the title image TPC will not be conducted.

In the case where the control unit 5 has passed the processing of said step S119 or S111, at the step S120, after waiting until the telecast stop time of the recording reserved program (the time point t7 of FIG. 2), the control unit 5 proceeds to the step S121.

At the step S121, the control unit 5 transmits the stop command to the VTR 20 corresponding to the time point t7 of FIG. 2, and after the predetermined time (e.g, few seconds) elapsed, transmitting the command signal of the power off to the VTR 20, terminates this processing.

If the next recording reserved program is registered continuously from the telecast end time of the present recording reserved program, the processing after the step S120 will be ignored and instead it moves to the processing of the step S103.

(4) Other Embodiments

Figure 5:
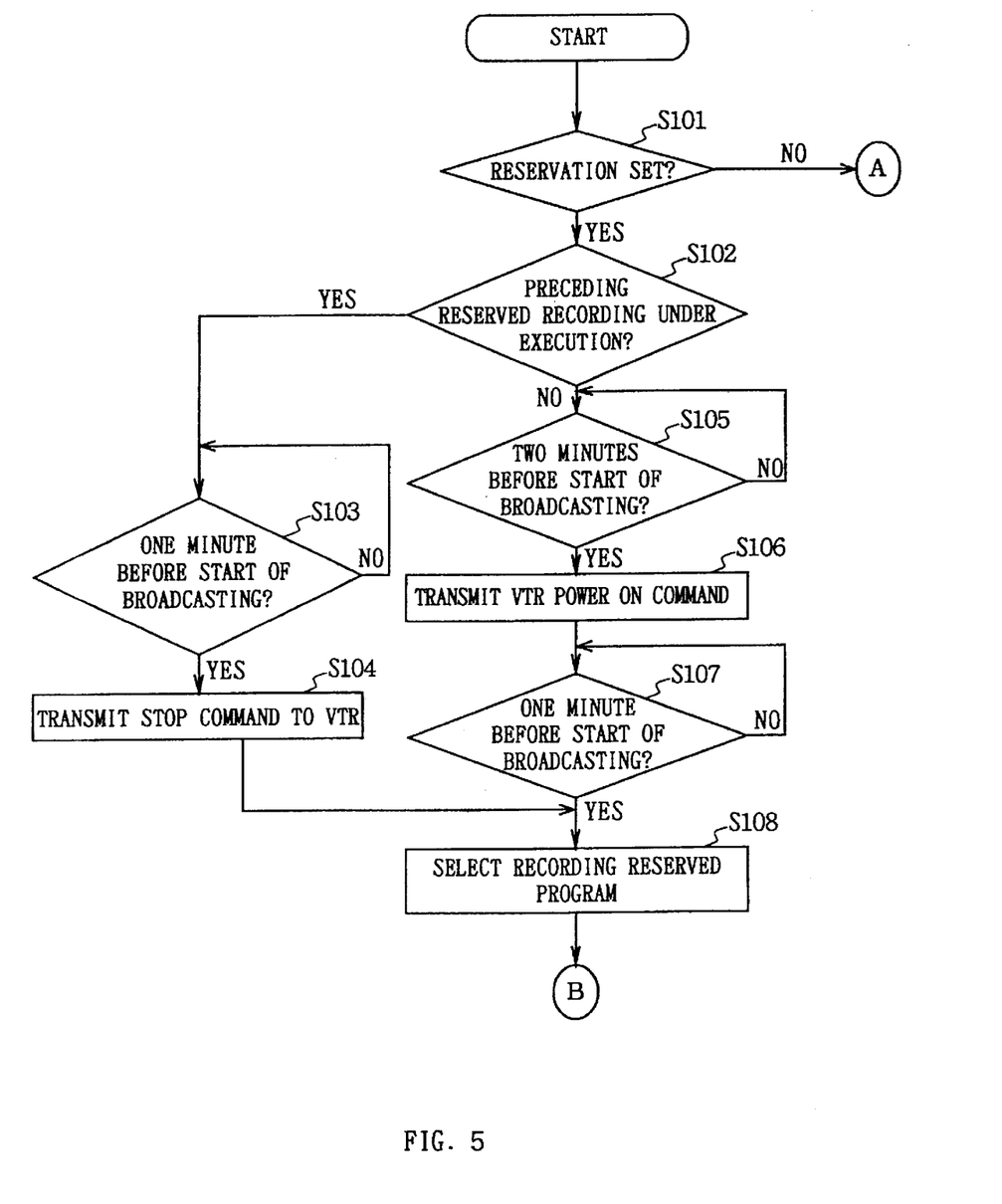
FIG. 5 is a flow chart showing the processing operation at the time of reserved recording (1) to be executed by the control unit of the digital satellite telecast receiving device.
Figure 6:
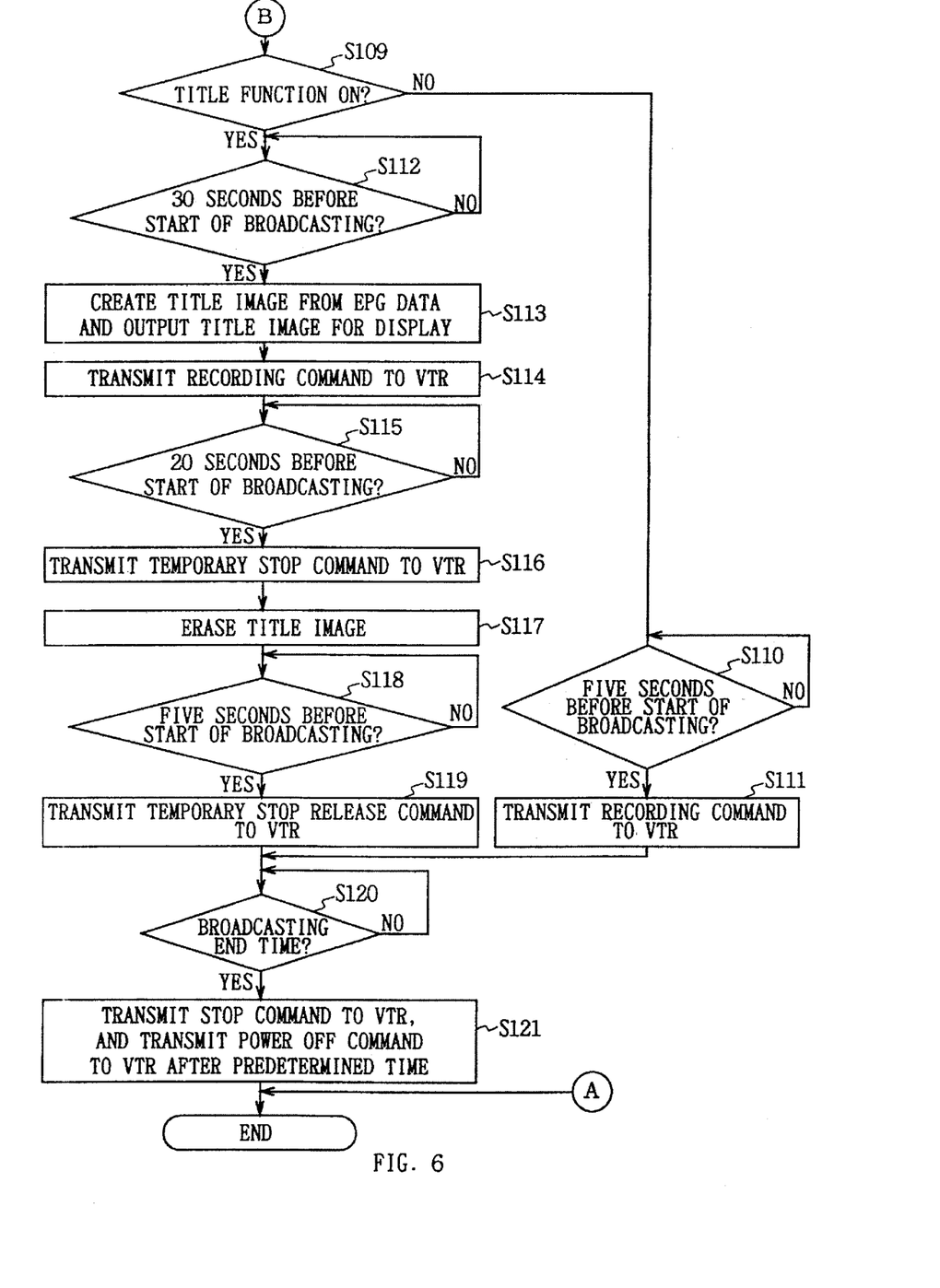
FIG. 6 is a flow chart showing the processing operation at the time of reserved recording (2) to be executed by the control unit of the digital satellite telecast receiving device.

The definite time setting in the processing operation shown in flow charts of FIGS. 5 and 6 is only an example and this may be changed according to the actual service condition.

Furthermore, according to the present invention, the embodiment described above is not only limited to the embodiment explained hitherto, but also it can be applied to the signal receiving device which corresponds the telecasting system in which information data regarding the telecasting program are piled over and for transmitting these, regardless of whether the satellite telecasting system or the telecasting system by the terrestrial wave, and regardless of whether the digital transmission system or analog transmission system, for example.

Figure 7:
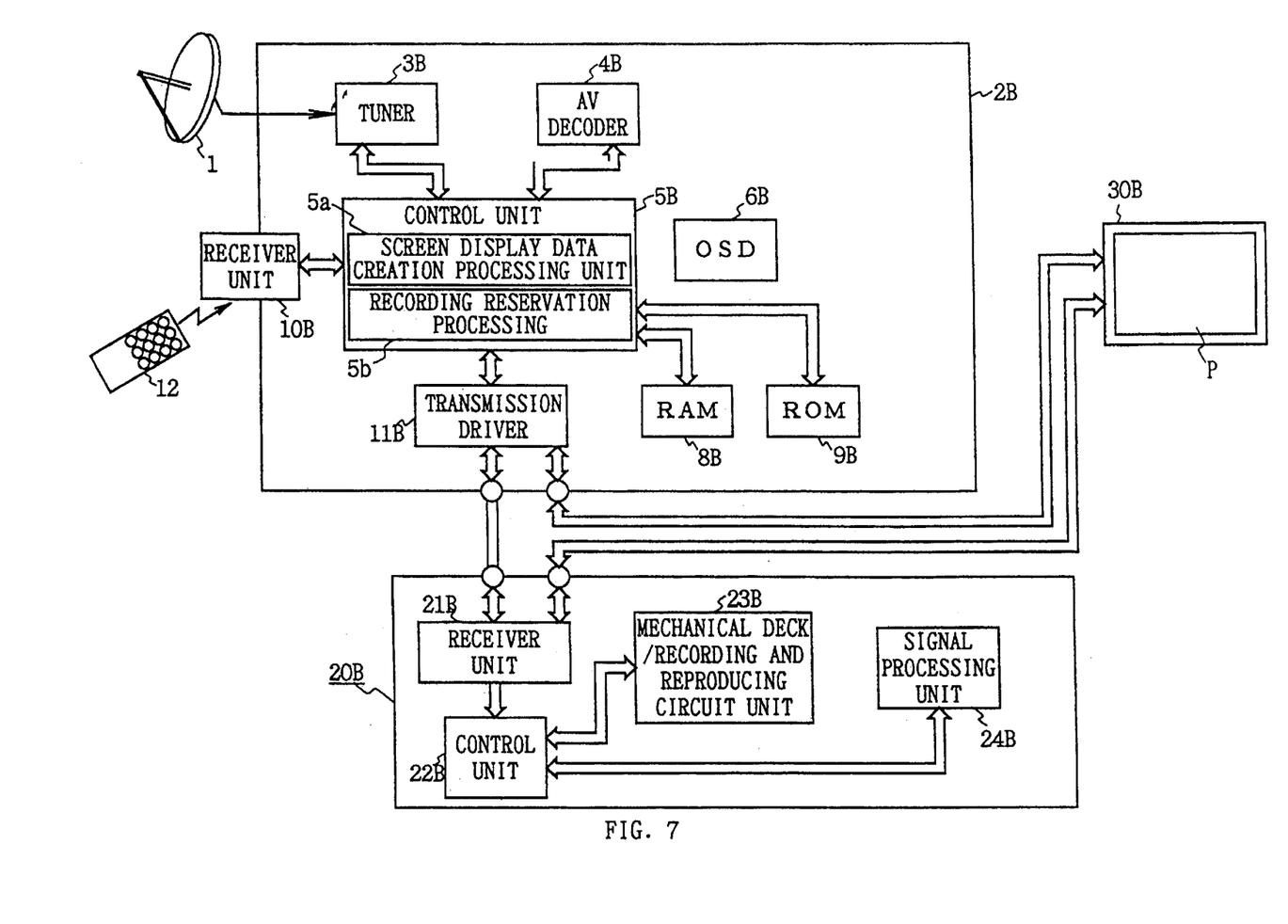
FIG. 7 is a block diagram showing the audio visual system comprised of the digital satellite telecast receiving device according to the other embodiment of the present invention.

Furthermore, according to the present invention, the embodiment described above has dealt with the case of using the AV system having the construction as shown in FIG. 1. However, the present invention is not only limited to this but also an AV system in which the digital satellite telecast receiving device 2B and the VTR 20B are connected via such as IEEE1394 bus as shown in FIG. 7 in which the corresponding parts with FIG. 1 are designated the same reference numerals, may be used.

In this case, a bus interface 11B is provided in the digital satellite telecast receiving device 2B in place of transmission driver 11 of FIG. 1, and a bus interface 21B is provided in the VTR 20B in place of the receiver unit 21 of FIG. 1.

Moreover, in this case, tuner 3B, AV decoder 4B, OSD 6B, RAM 8B and ROM 9B in the digital satellite telecast receiving device 2B are connected via bus each other centering around the control unit 5B. Video/audio information from the tuner 3B and EPG data output will be supplied to the AV decoder 4B via the bus.

The AV decoder 4B has the function for extracting the EPG data contained in the output of tuner 3B and supplying to the control unit 5B corresponding to the control of the control unit 5B. This EPG data is converted to the image data for required display screen (data for CRT screen display) by the control of the CRT screen display data forming processing block 5a in the control unit 5B and supplied to the on screen display circuit (OSD circuit) 6B via the bus. In this connection, according to the present invention, as the CRT screen display data, at least two kinds of display data are formed; i.e., the electronic program guide which plays a role as the program table showing the scheduled broadcast program from now on and the title image which plays a role as the title scene of the recording program.

Furthermore, of outputs of the tuner 3B entered into the AV decoder 4B, video data and audio data, after being received the required decoding processing and signal processing respectively, will be sent out as video signal and audio signal. In this case, the video signal, the audio signal and EPG data have the digital signal format.

The OSD circuit 6B, after forming image signal of the program information (CRT screen display signal) based on the image data of the data for CRT screen display data (program information data) supplied from the control unit 5B, supplies this to the control unit 5B.

The control unit 5B combines the video signal supplied from the AV decoder 4B and the video signal (CRT screen display signal) supplied from the OSD circuit 6B so that this combined video signal can be transmitted to the bus interface 11B.

The remote controller 12 is provided as an operation key for the user causing the digital satellite telecast receiving device 2B to conduct the desired operation. The command signal transmitted from the remote controller 12 responding to the user's operation will be received at the receiving unit 10B of the digital satellite telecast receiving device 2B side and transmitted to the control unit 5B via the bus.

In this connection, an operation unit equipped with the same type operation key as the remote controller 12 may be provided in the main body of the digital satellite telecast receiving device 2B (it is not shown in FIG. ) and this operation unit and the control unit 5B may be connected via the bus.

The control unit 5B, as well as executing the required control processing to each function circuit in the digital satellite telecast receiving device 2B responding to the command signal received, forms the data for CRT screen display based on the EPG data as described above and executes the control for sending this out as the video signal.

Furthermore, the digital satellite telecast receiving device 2B of the present embodiment is equipped with the reserved recording function capable of reserved recording the program received to the external recording device and in order to cope with this, the control unit 5B is equipped with the recording reservation processing block 5b.

In the RAM 8B, data to be used by the control unit 5B when executing various kinds of control processings are temporarily stored and an area in which the EPG data extracted by the AV decoder 4B are stored is provided. Moreover, according to the present embodiment, an area on which the specified recording scheduled program information are registered is provided.

In the ROM 9B, data of various kinds of programs to be executed by the control unit 5B are stored and in order to cope with the reserved recording function, it has a table corresponding to command codes adopted to the VTR according to makers and models.

According to the present embodiment, the name of maker and model of the VTR are set in advance according to the user's predetermined operation for example, and the control unit 5B causes the RAM 8B to hold this setting contents. And as the need for controlling the operation of the external VTR comes about, referring to said table, the control unit 5B supplies the required command code conforming to the maker and model set by the user. The bus interface 11B conducts the processing according to the prescribed bus protocol to the input command code and sends this out.

The VTR 20B is treated as a separate device from the digital satellite telecast receiving device 2B, and it inputs video/audio signal supplied from the outside via the bus interface 21B and it is so constructed that it can record onto the magnetic tape.

In the VTR 20B shown in this Fig., main units of the reproduction system are generally shown, and here the bus interface 21B, the mechanical deck/recording reproduction circuit 23B and the signal processing unit 24B are connected centering around the control unit 22B.

The bus interface 21B, receiving the command signal transmitted from the outside, conducts the processing based on the prescribed protocol and transmits this to the control unit 22B. The control unit 22B executes the required control processing to the mechanical deck/recording reproduction circuit 23B and the signal processing unit 24B based on the command signal received.

The mechanical deck/recording reproduction circuit 23B is equipped with a loading mechanism for loading the magnetic tape of the loaded video tape cassette, a run driving mechanism for running the loaded magnetic tape at the fixed speed, a rotating mechanism for rotating the rotary drum in which a head for conducting the recording/reproduction to the magnetic tape by helical scanning is provided according to the proper speed and phase, and a servo circuit system for realizing the appropriate driving operation and a recording reproduction circuit system comprising such as recording/reproduction amplifier for recording and reproducing the signal by said rotary head.

When recording, the signal processing unit 24B inputs video signal and audio signal entered from outside via the bus interface 21B, or (this is now shown in Fig.) video signal and audio signal to be obtained by receiving and selecting the terrestrial wave telecasting, analog satellite telecasting or digital satellite telecasting by the internal tuner and applies the required signal processing, and finally encodes the recording signal corresponding to the prescribed recording format and supplies to the mechanical deck/recording reproduction circuit 23B via the bus.

Moreover, when reproducing, the signal processing unit 24B outputs the video signal and audio signal to be obtained by applying the decoding processing corresponding to said recording format to the reproduction signal to be supplied from the mechanical deck/recording reproduction circuit 23B via the bus interface 21B.

In this case, since the video signal/audio signal of the digital satellite telecast receiving device 2B are transmitted to the bus interface 21B of the VTR 20B from the bus interface 11B of the digital satellite telecast receiving device 2B, the video signal/audio signal will be entered into the signal processing unit 24B.

Furthermore, the video signal/audio signal reproduced at the VTR 20B will be also transmitted to the monitor device 30B via the bus interface 21B.

In this case, a bus interface is provided in the monitor device 30B (not shown in FIG. ), and video and audio signal outputs of the digital satellite telecast receiving device 2B and the VTR 20B will be supplied as input sources. And for example, when the user optionally selects the input source, he can view either video source to be transmitted from the digital satellite telecast receiving device 2B or from the VTR 20B.

In the AV system thus constructed, by conducting the similar operation to that of the AV system in FIG. 1, the recording reserved program and corresponding title image TPC can be recorded and the same effect as those of the AV system of FIG. 1 can be obtained.

Application in the Industrial Field

In the telecasting system using the telecast satellite or the communication satellite, the signal receiving device and method according to the present invention can be utilized in the case of reserving and recording the recording scheduled program onto the external recording device, the electronic program guide information corresponding to this recording reserved program is recorded with this program guide.

What is claimed is:

1. A signal receiving device comprising:
   channel selecting means for selecting channels;
   telecast video output means for outputting the video information of the channel selected by said channel selecting means;
   program information image output means for forming the program information image having the information relating to the program per program based on the program information data and for outputting the video information of said program information image;

recording reservation program setting means for registering the desired program as the recording reserved program from among the telecast scheduled programs;

output control means for executing the control to the program information image output means which outputs video information of the program information image corresponding to said recording reserved program at the fixed timing different from the telecast time of said recording reserved program and the control to said telecast video output means which outputs video information of said recording reserved program at least during the telecast time of said recording reserved program; and operation control means for controlling the recording operation of the external recording device in which video information of said recording reserved program transmitted from said telecasting video output means and video information of said program information image transmitted from said program information image output means corresponding to the period during which the video information of said program information image is being transmitted and the period during which the video information of said recording reserved program is being transmitted.

2. A signal receiving device according to claim 1, comprising:

telecast wave receiving means connected to said channel selecting means and for receiving telecast waves.

3. A signal receiving device according to claim 2, wherein:

said telecast wave receiving means receives said program information data transmitted after being piled over said telecast wave; and said program information image output means extracts said program information data from among the signal received by said telecast wave receiving means.

4. A signal receiving device according to claim 1, wherein:

said operation control means causes said external recording device to start recording operation from the time point that is the fixed time before the telecast starting time point.

5. A signal receiving device according to claim 1, wherein:

said output control means provides the fixed time period between the output stop time point of video information of said program information image and the telecast start time point of the recording reserved program; and said operation control means stops the recording by said external recording device during said fixed time period.

6. A signal receiving device according to claim 1, wherein:

said signal receiving device comprising bus interface means, outputs video information of said program information image and video information of said recording reserved program via said bus interface means.

7. A signal receiving device according to claim 1, wherein:

said signal receiving means comprising bus interface means; and said operation control means controls said external recording device via said bus interface means.

8. A signal receiving method, wherein:

based on the registered contents of the desired program registered as the recording reserved program from the telecast scheduled program of the selected channel, conducts the control to output the video information of the program information image corresponding to the recording reserved program formed based on the program information data at the fixed timing different from the telecast time of the recording reserved program, and the control to output the video information of the recording reserved program at least during the telecast time of the recording reserved program; and controls the recording operation of the external recording device in which video information of the recording reserved program and video information of the program information image to be transmitted respectively corresponding to the time period during which the video information of the program information image is being transmitted and the the time period during which the video information of the recording reserved program is being transmitted are entered.

9. A signal receiving method according to claim 8, wherein:

said signal receiving method receives telecast waves and selects the desired channel from among said telecast waves.

10. A signal receiving method according to claim 9, wherein:

said signal receiving method receives said program information data transmitted after being piled over said telecast waves and extracts said program information data from among signals received.

11. A signal receiving method according to claim 8, wherein:

said signal receiving method causes the recording operation of said external recording device to start from the time point the fixed time before the telecast starting time point of said recording reserved program.

12. A signal receiving method according to claim 8, wherein:

provides the fixed time period between the output stop time point of the video information of said program information image and the telecast start time point of the recording reserved program and stops the recording by said external recording device during said fixed time period.

13. A signal receiving method according to claim 8, wherein:

said signal receiving method transmits video information of said program information image and video information of said recording reserved program.

14. A signal receiving method according to claim 8, wherein:

said signal receiving method controls the recording operation of said external recording device via said bus interface means.

* * * * *